(12) United States Patent
Zhang

(10) Patent No.: US 9,824,424 B2
(45) Date of Patent: Nov. 21, 2017

(54) IMAGE AMPLIFYING METHOD, IMAGE AMPLIFYING DEVICE, AND DISPLAY APPARATUS

(71) Applicant: BOE Technology Group Co., Ltd., Beijing (CN)

(72) Inventor: Lijie Zhang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 14/771,340

(22) PCT Filed: Jan. 4, 2015

(86) PCT No.: PCT/CN2015/070053
§ 371 (c)(1),
(2) Date: Aug. 28, 2015

(87) PCT Pub. No.: WO2016/045242
PCT Pub. Date: Mar. 31, 2016

(65) Prior Publication Data
US 2016/0364840 A1  Dec. 15, 2016

(30) Foreign Application Priority Data

Sep. 26, 2014 (CN) .......................... 2014 1 0503761

(51) Int. Cl.
*G06K 9/00* (2006.01)
*G06T 3/40* (2006.01)
(Continued)

(52) U.S. Cl.
CPC .............. *G06T 3/4007* (2013.01); *G06T 3/40* (2013.01); *G06T 5/50* (2013.01); *H04N 1/3876* (2013.01);
(Continued)

(58) Field of Classification Search
USPC ............... 382/167, 166, 263, 266, 284, 300; 348/222.1, 252, 383, 568, 750, E3.032,
(Continued)

(56) References Cited

U.S. PATENT DOCUMENTS 6,205,259 B1 * 3/2001 Komiya ................... G06T 5/50
348/E3.032
6,744,931 B2 * 6/2004 Komiya ................... G06T 5/50
345/629

(Continued)

FOREIGN PATENT DOCUMENTS

CN  101296338 A  10/2008
CN  101609549 A  12/2009
(Continued)

OTHER PUBLICATIONS

Jun. 26, 2015—International Search Report and Written Opinion App PCT/CN2015/070053 with English Tran.
(Continued)

*Primary Examiner* — Anh H Do
(74) *Attorney, Agent, or Firm* — Banner & Witcoff, Ltd.

(57) ABSTRACT

Embodiments of the disclosure provide an image amplifying method, an image amplifying device, and a display apparatus, and relate to field of image processing technique, the method comprises: obtaining, by an image amplifying device, high-frequency and low-frequency components of a source image; performing, by the image amplifying device, pixel interpolation on the low-frequency components of the source image through a first interpolation algorithm, to obtain a low-frequency sub-image; performing, by the image amplifying device, pixel interpolation on the high-frequency components of the source image through a second interpolation algorithm, to obtain a high-frequency sub-image; and merging, by the image amplifying device, the low-frequency and high-frequency sub-images, to obtain a
(Continued)

merged image; wherein the first interpolation algorithm and the second interpolation algorithm adopt different algorithms, so that it can ensure image quality of the amplified image while reducing the operation amount. Embodiments of the disclosure are applied to image amplification.

20 Claims, 8 Drawing Sheets

(51) Int. Cl.
G06T 5/50 (2006.01)
H04N 1/60 (2006.01)
H04N 1/387 (2006.01)

(52) U.S. Cl.
CPC .  *H04N 1/6008* (2013.01); *G06T 2207/10024* (2013.01); *G06T 2207/20221* (2013.01)

(58) Field of Classification Search
USPC ...................................... 348/E5.031, E9.007
See application file for complete search history.

(56) References Cited

U.S. PATENT DOCUMENTS

| 7,898,583 | B2* | 3/2011 | Wakahara | ................ | G06T 5/10 |
| | | | | | 348/252 |
| 8,339,468 | B2* | 12/2012 | Katagiri | ................ | H04N 19/40 |
| | | | | | 348/222.1 |
| 2003/0194150 | A1 | 10/2003 | Berkner | | |
| 2011/0200270 | A1 | 8/2011 | Kameyama | | |

FOREIGN PATENT DOCUMENTS

| CN | 101833754 A | 9/2010 |
| CN | 102156963 A | 8/2011 |
| CN | 103701468 A | 4/2014 |
| GB | 2256335 A | 12/1992 |
| JP | 2007148945 A | 6/2007 |

OTHER PUBLICATIONS

Jan. 3, 2017—(CN) First Office Action Appn 201410503761.9 with English Tran.
Jie Sun, "Application of Wavelet Analysis in Image Interpolation", Knowledge Economy, Oct. 5, 2008.
May 31, 2017—(CN) Second Office Action Appn 201410503761.9 with English Tran.

* cited by examiner

IMAGE AMPLIFYING METHOD, IMAGE AMPLIFYING DEVICE, AND DISPLAY APPARATUS

The application is a U.S. National Phase Entry of International Application No. PCT/CN2015/070053 filed on Jan. 4, 2015, designating the United States of America and claiming priority to Chinese Patent Application No. 201410503761.9 filed on Sep. 26, 2014. The present application claims priority to and the benefit of the above-identified applications and the above-identified applications are incorporated by reference herein in their entirety.

TECHNICAL FIELD

The present disclosure relates to an image amplifying method, an image amplifying device, and a display apparatus.

BACKGROUND

Image amplification aims to increase resolution of an amplified image to meet people's visual requirements or practical requirements by applications, image amplification has been significantly applied in the fields such as HDTV and medical images.

An image includes high-frequency components and low-frequency components, wherein the high-frequency components are mainly distributed in edge-contour portions and detail portions of respective subjects in the image, and the low-frequency components are mainly distributed in non-edge-contour portions of respective subjects in the image.

At present, the same algorithm is usually adopted to amplify the high-frequency components and the low-frequency components of an image, and interpolation algorithm is the most frequently used image amplifying algorithm to amplify an image, those widely used of which include nearest neighbor interpolation, bilinear interpolation and cubic convolution interpolation. Among them, the nearest neighbor interpolation algorithm is the simplest, but it is also the most apt to produce discontinuous pixel values, leading to a blocking effect and thus blurring the image, quality effect of the amplified image is generally not perfect enough. The bilinear interpolation algorithm is relatively complicated, it will not cause the situation of discontinuous pixel values, the amplified image has a higher quality, but because the bilinear interpolation has a property of a low pass filter, the high-frequency components will be damaged, so it may cause the edge-contour portions and the detail portions of respective subjects in the image to blur to some extent. The cubic convolution interpolation algorithm is complicated, it can retain relatively sharp edge-contours and details, and can reduce or avoid jagged edge-contours and comb-like details of respective subjects in the amplified image, the interpolation effect is relatively real, and the image quality is more perfected after amplification.

In the techniques known to the inventors, one image amplifying algorithm is adopted to amplify an image, but based on the aforesaid techniques known to the inventors, since an image pixel grayscale in the low-frequency components of the image changes slightly, no matter adopting a simple algorithm or a complicated algorithm, amplifying effect on the low-frequency components of the image is equivalent; and for the high-frequency components of the image, better image quality can be achieved by using a more complicated algorithm, but for both the high-frequency components and the low-frequency components of the image, an additional calculation amount will be increased in case of using a complicated algorithm to amplify, so it is impossible to ensure both the image quality of the amplified image and a low operation amount of the amplification process at the same time.

SUMMARY

The embodiments of the present disclosure provide an image amplifying method, an image amplifying device, and a display apparatus, which can ensure image quality of the amplified image while reducing the operation amount.

In a first aspect, an image amplifying method is provided, comprising steps of:

obtaining, by an image amplifying device, high-frequency components and low-frequency components of a source image;

performing, by the image amplifying device, pixel interpolation on the low-frequency components of the source image through a first interpolation algorithm, to obtain a low-frequency sub-image;

performing, by the image amplifying device, pixel interpolation on the high-frequency components of the source image through a second interpolation algorithm, to obtain a high-frequency sub-image; and merging, by the image amplifying device, the low-frequency sub-image and the high-frequency sub-image, to obtain a merged image;

wherein the first interpolation algorithm and the second interpolation algorithm adopt different algorithms.

Optionally, the image amplifying device obtains the high-frequency components and the low-frequency components of the source image through a wavelet packet decomposition scheme.

Optionally, the image amplifying device merges the low-frequency sub-image and the high-frequency sub-image, through a wavelet packet inverse transform, to obtain the merged image.

Optionally, prior to obtaining, by an image amplifying device, high-frequency components and low-frequency components of a source image, the method further comprises:

performing, by the image amplifying device, a RGB-YUV space transform on the source image.

Optionally, after merging, by the image amplifying device, the low-frequency sub-image and the high-frequency sub-image to obtain a merged image, the method further comprises:

performing, by the image amplifying device, a YUV-RGB space inverse transform on the merged image.

Optionally, the first interpolation algorithm includes: a nearest neighbor interpolation algorithm, a bilinear interpolation algorithm, and a cubic convolution interpolation algorithm; and the second interpolation algorithm includes: a nearest neighbor interpolation algorithm, and cubic convolution interpolation algorithm.

Optionally, the first interpolation algorithm is a bilinear interpolation algorithm; and the step of performing, by the image amplifying device, pixel interpolation on the low-frequency components of the source image through a first interpolation algorithm to obtain a low-frequency sub-image comprises:

selecting, by the image amplifying device, four pixel dots adjacent to a pixel dot to be interpolated in the low-frequency components of the source image;

obtaining, by the image amplifying device, a pixel grayscale difference in a horizontal direction, a pixel grayscale difference in a vertical direction, and a pixel grayscale in a diagonal direction of the four pixel dots adjacent to the pixel dot to be interpolated, according to locations and grayscales of the four pixel dots adjacent to the pixel dot to be interpolated;

obtaining, by the image amplifying device, distances from the pixel dot to be interpolated to the four pixel dots adjacent to the pixel dot to be interpolated, according to the pixel grayscale difference in a horizontal direction, the pixel grayscale difference in a vertical direction, and the pixel grayscale in a diagonal direction;

setting, by the image amplifying device, weighting factors for the four pixel dots adjacent to the pixel dot to be interpolated, according to the distances from the pixel dot to be interpolated to the four pixel dots adjacent to the pixel dot to be interpolated; and performing, by the image amplifying device, pixel interpolation on the pixel dot to be interpolated, through the bilinear interpolation algorithm, according to the weighting factors, to obtain an interpolated low-frequency sub-pixel image.

In a second aspect, an image amplifying device is provided, comprising:

an image decomposition unit configured to obtain high-frequency components and low-frequency components of a source image;

an image interpolation unit configured to perform pixel interpolation on the low-frequency components of the source image obtained by the image decomposition unit, through a first interpolation algorithm, to obtain a low-frequency sub-image;

the image interpolation unit further configured to perform pixel interpolation on the high-frequency components of the source image obtained by the image decomposition unit, through a second interpolation algorithm, to obtain a high-frequency sub-image; and an image merging unit configured to merge the low-frequency sub-image and the high-frequency sub-image obtained by the image interpolation unit, to obtain a merged image;

wherein the first interpolation algorithm and the second interpolation algorithm adopt different algorithms.

Optionally, the image decomposition unit is configured to obtain the high-frequency components and the low-frequency components of the source image through a wavelet packet decomposition scheme.

Optionally, the image merging unit is configured to merge the low-frequency sub-image and the high-frequency sub-image obtained by the image interpolation unit, through a wavelet packet inverse transform, to obtain the merged image.

Optionally, the image amplifying device further comprises: a transform unit configured to perform a RGB-YUV space transform on the source image.

Optionally, the transform unit is further configured to perform a YUV-RGB space inverse transform on the merged image.

Optionally, the first interpolation algorithm includes: a nearest neighbor interpolation algorithm, a bilinear interpolation algorithm, and a cubic convolution interpolation algorithm; and the second interpolation algorithm includes: a nearest neighbor interpolation algorithm, and cubic convolution interpolation algorithm.

Optionally, the first interpolation algorithm is a bilinear interpolation algorithm, and the image interpolation unit comprises:

a sampling sub-unit configured to select four pixel dots adjacent to a pixel dot to be interpolated in the low-frequency components of the source image;

a pixel grayscale difference obtaining sub-unit configured to obtain a pixel grayscale difference in a horizontal direction, a pixel grayscale difference in a vertical direction, and a pixel grayscale in a diagonal direction of the four pixel dots adjacent to the pixel dot to be interpolated which are selected by the sampling sub-unit, according to locations and grayscales of the four pixel dots adjacent to the pixel dot to be interpolated;

a distance obtaining sub-unit configured to obtain distances from the pixel dot to be interpolated to the four pixel dots adjacent to the pixel dot to be interpolated, according to the pixel grayscale difference in a horizontal direction, the pixel grayscale difference in a vertical direction, and the pixel grayscale in a diagonal direction which are obtained by the pixel grayscale difference obtaining sub-unit;

a weighting factor setting sub-unit configured to set weighting factors for the four pixel dots adjacent to the pixel dot to be interpolated, according to the distances from the pixel dot to be interpolated to the four pixel dots adjacent to the pixel dot to be interpolated, which are obtained by the distance obtaining sub-unit; and an image interpolation sub-unit configured to perform pixel interpolation on the pixel dot to be interpolated through the bilinear interpolation algorithm according to the weighting factors set by the weighting factor setting sub-unit, to obtain an interpolated low-frequency sub-pixel image.

In a third aspect, a display apparatus is provided, comprising any the image amplifying device described above.

The image amplifying method, the image amplifying device, and the display apparatus provided in the embodiments of the present disclosure first obtains high-frequency components and low-frequency components of a source image, then performs pixel interpolation on the pixels of the low-frequency components through a first interpolation algorithm to obtain a low-frequency sub-image and performs pixel interpolation on the pixels of the high-frequency components through a second interpolation algorithm to obtain a high-frequency sub-image, and finally merges the low-frequency sub-image and the high-frequency sub-image to obtain a merged image. Because interpolation is performed respectively on the high-frequency components and the low-frequency components of the source image through different interpolation algorithms, it can ensure image quality of the amplified image while reducing the operation amount.

DETAILED DESCRIPTION OF THE EMBODIMENTS

Figure 1:
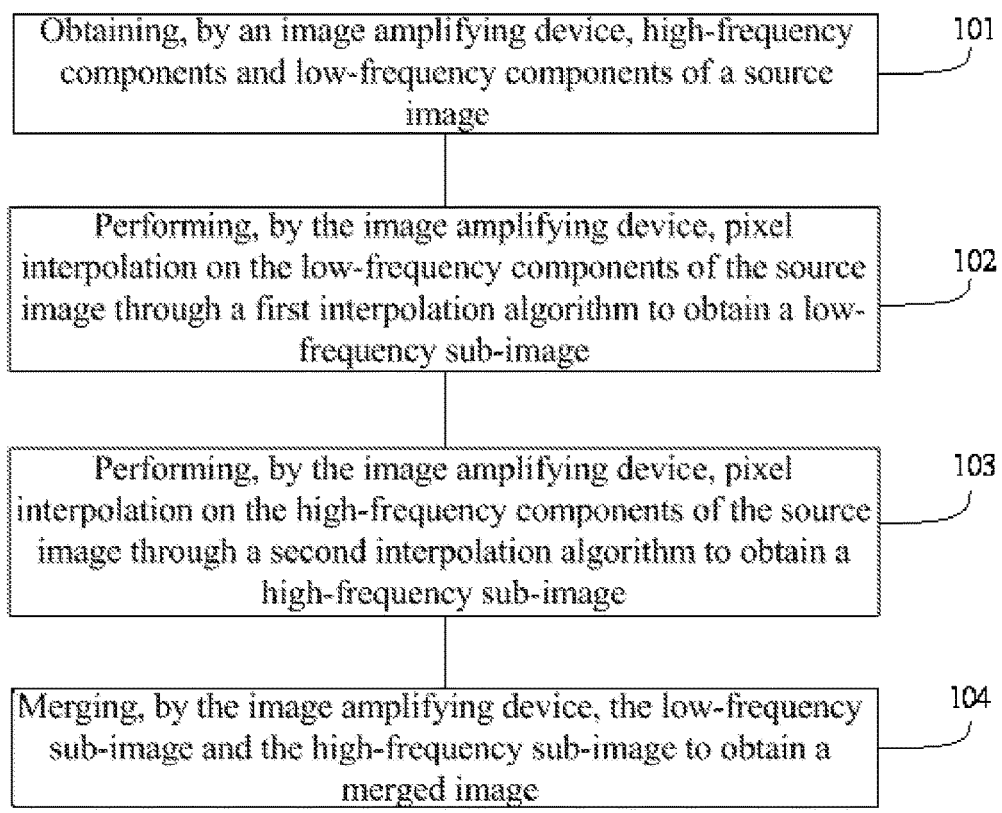
FIG. 1 is a schematic flowchart of the image amplifying method provided by an embodiment of the present disclosure.

Hereinafter, the image amplifying method and the image amplifying device provided by the embodiments of the present disclosure will be described in detail with reference to the accompanying drawings, wherein like reference numerals are used to indicate like elements throughout. In the following description, to facilitate explanation, numerous details are given to provide a thorough understanding of one or more embodiments. However, apparently, the embodiments may also be implemented without using these details. In other examples, commonly known structures and devices are shown in a form of block diagram, to facilitate describing one or more embodiments.

Referring to FIG. 1, an embodiment of the present disclosure provides an image amplifying method comprising the following steps.

Step 101 is obtaining, by an image amplifying device, high-frequency components and low-frequency components of a source image.

Optionally, in step 101, the high-frequency components and the low-frequency components of the source image may be obtained by adopting a wavelet packet decomposition scheme; an optional step 101 is: obtaining, by the image amplifying device, the high-frequency components and the low-frequency components of the source image through a wavelet packet decomposition scheme, wherein the wavelet packet decomposition is an extension of wavelet decomposition, the wavelet packet decomposition not only decomposes a low-frequency portion of an image, but also further decomposes a high-frequency portion of the image, and can further adaptively select a corresponding frequency band to match an image spectrum according to image signal characteristics and analysis requirements, it is a decomposition method more refined than the wavelet decomposition, and has more accurate analysis capability.

Step 102 is performing, by the image amplifying device, pixel interpolation on the low-frequency components of the source image through a first interpolation algorithm to obtain a low-frequency sub-image;

wherein the first interpolation algorithm adopted in step 102 may include: a nearest neighbor interpolation algorithm, a bilinear interpolation algorithm, and a cubic convolution interpolation algorithm.

Step 103 is performing, by the image amplifying device, pixel interpolation on the low-frequency components of the source image through a second interpolation algorithm to obtain a high-frequency sub-image;

wherein the second interpolation algorithm adopted in step 103 may include: a nearest neighbor interpolation algorithm, and cubic convolution interpolation algorithm.

Step 104 is merging, by the image amplifying device, the low-frequency sub-image and the high-frequency sub-image to obtain a merged image.

Optionally, in step 104, a wavelet packet inverse transform may be adopted to merge the low-frequency sub-image and the high-frequency sub-image.

The first interpolation algorithm and the second interpolation algorithm adopt different algorithms.

The image amplifying method in the embodiments of the present disclosure first obtains high-frequency components and low-frequency components of a source image, then performs pixel interpolation on the pixels of the low-frequency components through a first interpolation algorithm to obtain a low-frequency sub-image and performs pixel interpolation on the pixels of the high-frequency components through a second interpolation algorithm to obtain a high-frequency sub-image, and finally merges the low-frequency sub-image and the high-frequency sub-image to obtain a merged image. Because interpolation is performed respectively on the high-frequency components and the low-frequency components of the source image through different interpolation algorithms in the embodiments of the present disclosure, the image amplifying method and device provided by the embodiments of the present disclosure can ensure image quality of the amplified image while reducing the operation amount.

Figure 2:
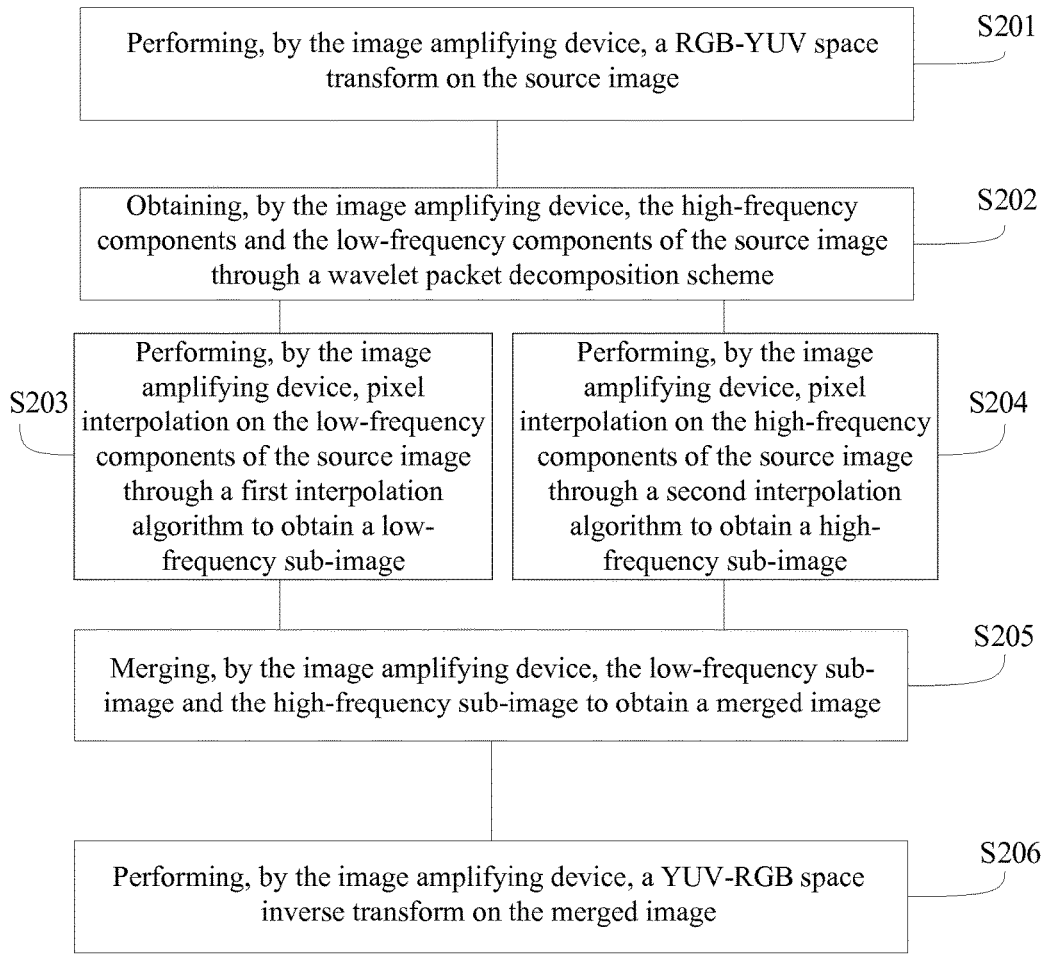
FIG. 2 is a schematic flowchart of the image amplifying method provided by another embodiment of the present disclosure.

An embodiment of the present application provides another implementation of the image amplifying method, comprising the following steps, as shown in FIG. 2.

S201 is performing, by the image amplifying device, a RGB-YUV space transform on the source image;

wherein, through RGB-YUV space transform, the source image in a RGB color space can be transformed to the source image in a YUV color space; RGB is an industry color standard wherein various colors are obtained by changing three color channels of R-red, G-green, and B-blue and superimposing them on each other; YUV is a PAL (Phase Alteration Line) color coding method wherein a luminance signal Y of YUV and chrominance signals U, V of YUV are separated, and wherein because vision has a higher sensitivity for the luminance signal than the chrominance signals, through the RGB-YUV space transform, stability of the luminance signal of the original image can be ensured during the following interpolation process on the original image, and further it can be ensured that the amplified image has a good visual effect.

Figure 3:
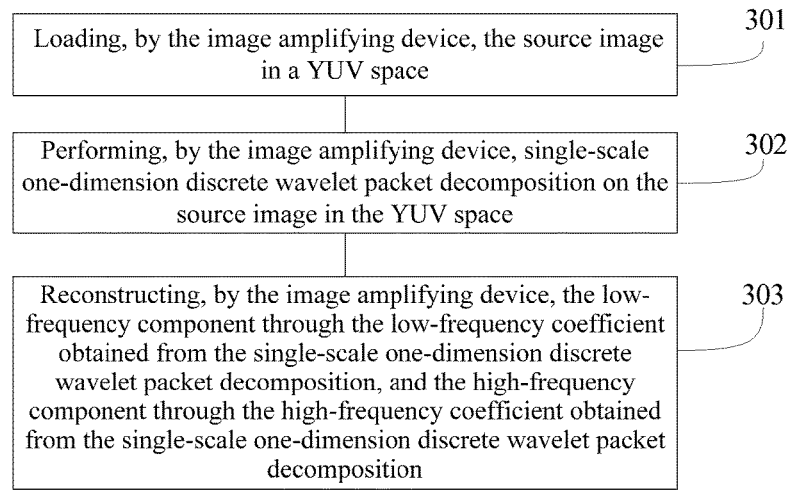
FIG. 3 is a schematic flowchart of adopting a wavelet packet decomposition to perform decomposition on the source image of a YUV space.
Figure 4:
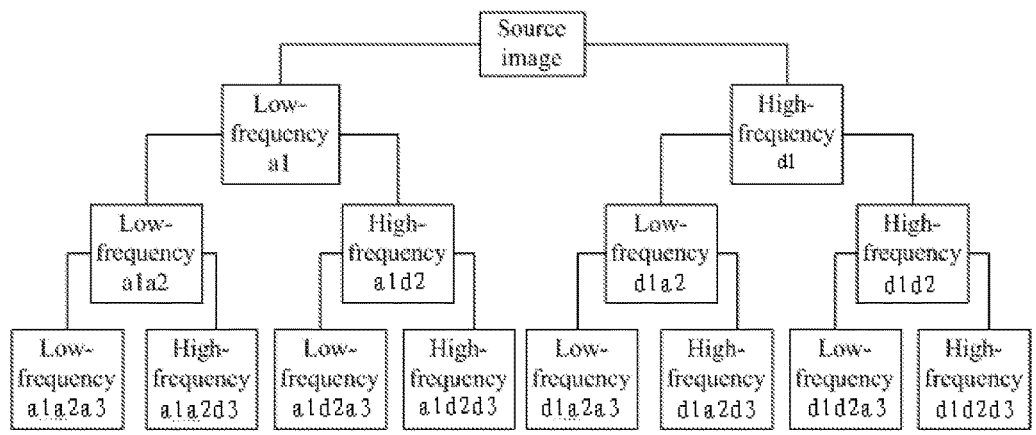
FIG. 4 is a schematic diagram of principle of adopting a wavelet packet decomposition to perform decomposition on the source image of a YUV space.

S202 is obtaining, by the image amplifying device, the high-frequency components and the low-frequency components of the source image through a wavelet packet decomposition scheme;

wherein, in step S202, the high-frequency components and the low-frequency components of the original image are obtained from the original image in the YUV color space, as shown in FIG. 3, step S202 comprises the following steps:

301, loading, by the image amplifying device, the source image in a YUV space;

302, performing, by the image amplifying device, single-scale one-dimension discrete wavelet packet decomposition on the source image in the YUV space;

referring to FIG. 4, first, the image amplifying device decomposes the source image in the YUV space through the wavelet packet decomposition scheme into low-frequency a1 and high-frequency d1, wherein the low-frequency a1 is represented by a corresponding low-frequency coefficient cA1, and the high-frequency d1 is represented by a corresponding high-frequency coefficient cD1; both cA1 and cD1 are wavelet coefficients generated during the wavelet packet decomposition; during the decomposition, information lost from the low-frequency a1 is captured by the high-frequency d1; then, in a next layer of decomposition, a1 is again decomposed two portions of low-frequency a1a2 and high-frequency a1d2, and corresponding high-frequency coefficient cA1A2 and low-frequency coefficient cA1D2 are generated, d1 is decomposed into two portions of low-frequency d1a2 and high-frequency d1d2, and corresponding low-frequency coefficient cD1A2 and high-frequency coefficient cD1D2 are generated, information lost from the low-frequency a1a2 is captured by the high-frequency a1d2, information lost from the low-frequency d1a2 is captured by the high-frequency d1d2; by parity of reasoning, it is possible to perform decomposition in an N-th layer. A value of N may be adjusted according to levels of the qualities of the source image and the target image. For example, relevance between coefficients of the source image in the YUV space is characterized by adopting an energy logarithm $$M(\{x_n\}) = \sum_k \log|x_n|^2$$

as a cost function, a value of n to which the minimum M corresponds is calculated, which is an optimal basis of the wavelet decomposition, that is, the current N value, wherein $x_n$ is the wavelet coefficient;

303, reconstructing, by the image amplifying device, the low-frequency component through the low-frequency coefficient obtained from the single-scale one-dimension discrete wavelet packet decomposition, and the high-frequency component through the high-frequency coefficient obtained from the single-scale one-dimension discrete wavelet packet decomposition;

in the case that the above N=1, that is, only the low-frequency coefficient cA1 and the high-frequency coefficient cD1 are obtained, in step 303, the low-frequency component is reconstructed through the low-frequency coefficient cA1, the high-frequency component is reconstructed through the high-frequency coefficient cD1; in the case that N=2, that is, the low-frequency coefficients cA1A2, cD1A2 and the high-frequency coefficients cA1D2, cD1D2 are obtained, in step 303, the low-frequency component is reconstructed through the low-frequency coefficients cA1A2, cD1A2, the high-frequency component is reconstructed through the high-frequency coefficients cA1D2, cD1D2.

Through the above steps 301-303, the image amplifying device obtains the high-frequency components and the low-frequency components of the source image.

S203 is performing, by the image amplifying device, pixel interpolation on the low-frequency components of the source image through a first interpolation algorithm to obtain a low-frequency sub-image.

Figure 5A:
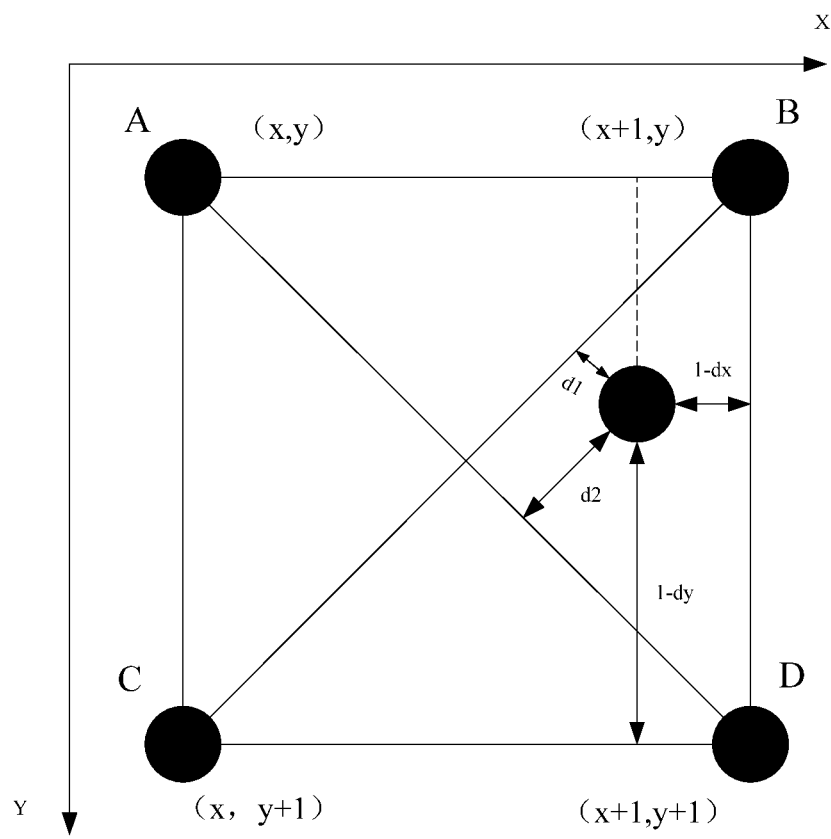
FIG. 5a is a schematic diagram of principle based on the bilinear interpolation algorithm, provided by an embodiment of the present disclosure.
Figure 5B:
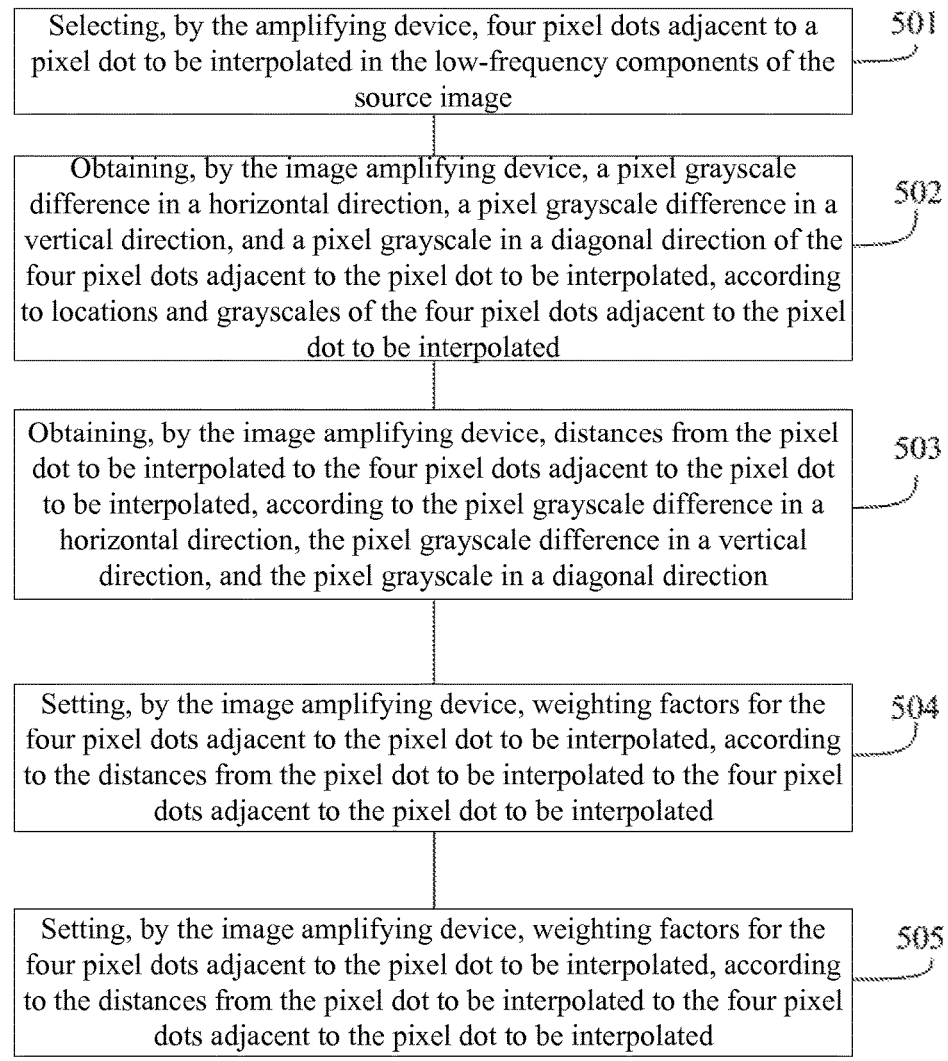
FIG. 5b a schematic flowchart of a method for performing pixel interpolation on the low-frequency components based on the bilinear interpolation algorithm, provided by an embodiment of the present disclosure.

Next, explanations are provided with the first interpolation algorithm being a bilinear interpolation algorithm as example. Referring to FIGS. 5a and 5b, step S203 is:

501, selecting, by the amplifying device, four pixel dots A, B, C, D adjacent to a pixel dot to be interpolated in the low-frequency components of the source image;

wherein the pixel dot to be interpolated is a virtual dot, since pixel dots in an image are arranged in rows and columns, when a pixel dot is being interpolated, any pixel dot interpolated has four adjacent pixel dots, and thus, in step 501, the four pixel dots A, B, C, D are pixel dots corresponding to any pixel dot interpolated among all pixel dots interpolated, by which an amplification scale can be achieved;

502, obtaining, by the image amplifying device, a pixel grayscale difference in a horizontal direction, a pixel grayscale difference in a vertical direction, and a pixel grayscale in a diagonal direction of the four pixel dots adjacent to the pixel dot to be interpolated, according to locations and grayscales of the four pixel dots adjacent to the pixel dot to be interpolated;

503, obtaining, by the image amplifying device, distances from the pixel dot to be interpolated to the four pixel dots adjacent to the pixel dot to be interpolated, according to the pixel grayscale difference in a horizontal direction, the pixel grayscale difference in a vertical direction, and the pixel grayscale in a diagonal direction.

504, setting, by the image amplifying device, weighting factors for the four pixel dots adjacent to the pixel dot to be interpolated, according to the distances from the pixel dot to be interpolated to the four pixel dots adjacent to the pixel dot to be interpolated;

wherein, referring to FIG. 5a, in step 504, the image amplifying device obtains a displacement of the pixel dot to be interpolated with a horizontal direction and a displacement of the pixel dot to be interpolated with a vertical direction, according to the distances from the pixel dot to be interpolated to the four pixel dots adjacent to the pixel dot to be interpolated; and performs normalization on the displacement of the pixel dot to be interpolated with a horizontal direction and the displacement of the pixel dot to be interpolated with a vertical direction, to obtain a normalized displacement dy of the pixel dot to be interpolated with a horizontal direction and a normalized displacement dx of the pixel dot to be interpolated with a vertical direction, and sets weighting factors for the four pixel dots adjacent to the pixel dot to be interpolated, according to dx and dy;

wherein, as shown in FIG. 5a, the above step 502 adopts dy to represent a pixel grayscale difference of a horizontal direction as:

$$C(d\_H) = \tfrac{1}{2} dy |f(x,y) - f(x+1,y)| + \tfrac{1}{2}(1-dy)|f(x,y+1) - f(x+1,y+1)|$$

wherein, as shown in FIG. 5a, the above step 502 adopts dx to represent a pixel grayscale difference of a vertical direction as:

$$C(d\_V) = \tfrac{1}{2} dx |f(x,y) - f(x,y+1)| + \tfrac{1}{2}(1-dx)|f(x+1,y) - f(x+1,y+1)|$$

the pixel grayscale difference between pixel dot A and pixel dot C in a first diagonal direction is:

$$C(d\_D2) = d2|f(x,y) - f(x+1,y+1)|$$

the pixel grayscale difference between pixel dot B and pixel dot D in a second diagonal direction is:

$$C(d\_D1) = d1|f(x+1,y) - f(x,y+1)|$$

a total pixel grayscale difference in diagonal directions of a rectangle formed by the four pixel dots shown in FIG. 5a is:

$$C(d\_D) = \frac{d1}{2}|f(x+1,y) - f(x,y+1)| + \frac{d2}{2}|f(x,y) - f(x+1,y+1)|$$

wherein a distance from the pixel dot to be interpolated to a diagonal direction of the pixel dot B and the pixel dot D is:

$$d1 = \frac{\sqrt{2}}{2}|dx - dy|$$

a distance from the pixel dot to be interpolated to a diagonal direction of the pixel dot A and the pixel dot C is:

$$d2 = \frac{|1 - dx - dy|}{\sqrt{2}}$$

in the above respective equations, f(m, n) is a grayscale correlation function of respective pixel dot, m is a coordinate in a horizontal direction, n is a coordinate in a vertical direction;

the magnitude of the pixel grayscale is the magnitude of the correlation, the smaller the correlation is, the more probably the pixel dot to be interpolated is in the direction; on the contrary, the more probably the pixel dot to be interpolated is away from the direction;

505, performing, by the image amplifying device, pixel interpolation on the pixel dot to be interpolated, through the bilinear interpolation algorithm, according to the weighting factors, to obtain an low-frequency sub-pixel image.

In step 505, first the bilinear interpolation algorithm adopted is determined according to an absolute value D_Val of the differences between any two of C(d_H), C(d_H), and C(d_D), calculated as below:

$$D\_Val\_HV = |C(d\_H) - C(d\_V)|,$$

$$D\_Val\_HD = |C(d\_H) - C(d\_D)|,$$

$$D\_Val\_VD = |C(d\_V) - C(d\_D)|,$$

The threshold is set as T, if D_Val≤T, the bilinear interpolation algorithm is adopted;

if D_Val>T, it needs to be processed separately:

if D_Val_HV>T∥D_Val_HD>T, the bilinear interpolation algorithm is adopted;

if D_Val_HV>T∥D_Val_VD>T, the bilinear interpolation algorithm is adopted;

if D_Val_HD>T∥D_Val_VD>T, the bilinear interpolation algorithm based on direction correlation is adopted.

Finally, the weighting factors are substituted into the corresponding bilinear interpolation algorithm as coefficients of respective directions, to obtain the pixel grayscale to be interpolated.

S204 is performing, by the image amplifying device, pixel interpolation on the high-frequency components of the source image through a second interpolation algorithm to obtain a high-frequency sub-image.

In the embodiment of the present disclosure, in the case that the first interpolation algorithm adopts a bilinear interpolation algorithm, the second interpolation algorithm adopted should be an interpolation algorithm different from the bilinear interpolation algorithm, for example, cubic convolution interpolation algorithm, wherein it is a technique known to the inventors to perform pixel interpolation on the pixel by adopting the cubic convolution interpolation algorithm, no more details repeated herein.

S205 is merging, by the image amplifying device, the low-frequency sub-image and the high-frequency sub-image through a wavelet packet inverse transform to obtain a merged image.

Figure 6:
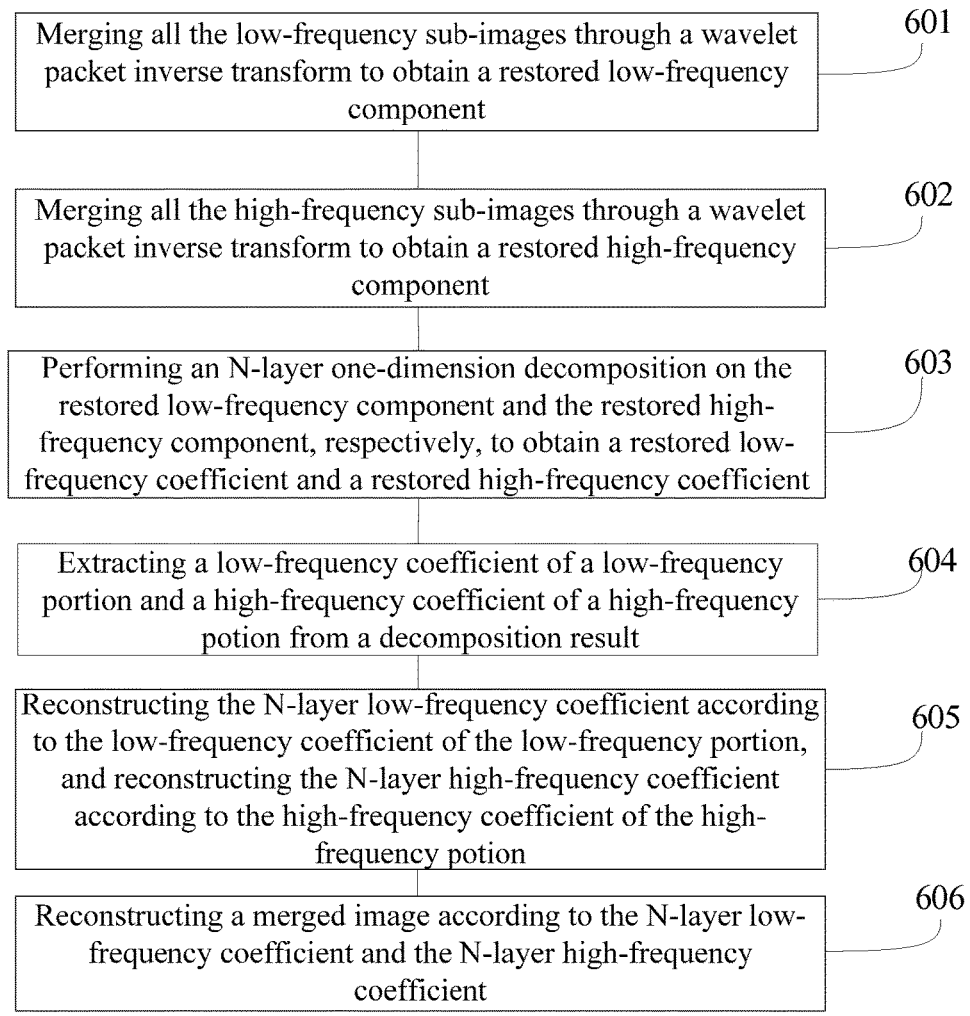
FIG. 6 is a schematic flowchart of merging the low-frequency sub-image and the high-frequency sub-image through a wavelet packet inverse transform, provided by an embodiment of the present disclosure.

Referring to FIG. 6, step S205 comprises:

601, merging all the low-frequency sub-images through a wavelet packet inverse transform to obtain a restored low-frequency component;

602, merging all the high-frequency sub-images through a wavelet packet inverse transform to obtain a restored high-frequency component;

wherein the restored low-frequency component may be defined as a low-frequency merged sub-image; the restored high-frequency component may be defined as a high-frequency merged sub-image; this process is an inverse process of FIG. 4, which is a technique known to the inventors, no more details repeated herein.

603, performing an N-layer one-dimension decomposition on the restored low-frequency component and the restored high-frequency component, respectively, to obtain a restored low-frequency coefficient and a restored high-frequency coefficient;

604, extracting a low-frequency coefficient of a low-frequency portion and a high-frequency coefficient of a high-frequency portion from the result of the decomposition;

605, reconstructing the N-layer low-frequency coefficient according to the low-frequency coefficient of the low-frequency portion, and reconstructing the N-layer high-frequency coefficient according to the high-frequency coefficient of the high-frequency potion; and 606, reconstructing a merged image according to the N-layer low-frequency coefficient and the N-layer high-frequency coefficient.

S206 is performing, by the image amplifying device, a YUV-RGB space inverse transform on the merged image.

Optimally, the interpolation algorithm in S203 may be: a nearest neighbor interpolation algorithm, a bilinear interpolation algorithm, and a cubic convolution interpolation algorithm; and the interpolation algorithm in S204 may be: a nearest neighbor interpolation algorithm, and cubic convolution interpolation algorithm.

The image amplifying method provided in the embodiments of the present disclosure first obtains high-frequency components and low-frequency components of a source image, then performs pixel interpolation on the pixels of the low-frequency components through a first interpolation algorithm to obtain a low-frequency sub-image and performs pixel interpolation on the pixels of the high-frequency components through a second interpolation algorithm to obtain a high-frequency sub-image, and finally merges the low-frequency sub-image and the high-frequency sub-image to obtain a merged image. Because interpolation is performed respectively on the high-frequency components and the low-frequency components of the source image through different interpolation algorithms, it can ensure image quality of the amplified image while reducing the operation amount.

Figure 7:
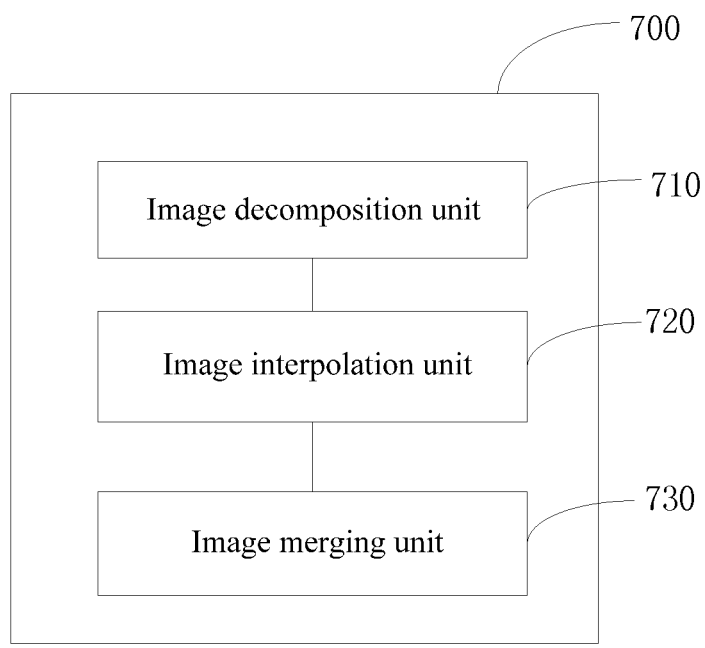
FIG. 7 is a schematic structural diagram of the image amplifying device provided by an embodiment of the present disclosure.

Referring to FIG. 7, yet another embodiment of the present disclosure provides an image amplifying device 700, comprising:

an image decomposition unit 710 configured to obtain high-frequency components and low-frequency components of a source image;

an image interpolation unit 720 configured to perform pixel interpolation on the low-frequency components of the source image obtained by the image decomposition unit 710, through a first interpolation algorithm, to obtain a low-frequency sub-image;

the image interpolation unit 720 further configured to perform pixel interpolation on the high-frequency components of the source image obtained by the image decomposition unit 710, through a second interpolation algorithm, to obtain a high-frequency sub-image; and an image merging unit 730 configured to merge the low-frequency sub-image and the high-frequency sub-image obtained by the image interpolation unit 720, to obtain a merged image;

wherein the first interpolation algorithm and the second interpolation algorithm adopt different algorithms.

The image amplifying device provided in the embodiments of the present disclosure first obtains high-frequency components and low-frequency components of a source image, then performs pixel interpolation on the pixels of the low-frequency components through a first interpolation algorithm to obtain a low-frequency sub-image and performs pixel interpolation on the pixels of the high-frequency components through a second interpolation algorithm to obtain a high-frequency sub-image, and finally merges the low-frequency sub-image and the high-frequency sub-image to obtain a merged image. Because interpolation is performed respectively on the high-frequency components and the low-frequency components of the source image through different interpolation algorithms, it can ensure image quality of the amplified image while reducing the operation amount.

Optionally, the image decomposition unit 710 is configured to obtain the high-frequency components and the low-frequency components of the source image through a wavelet packet decomposition scheme.

Optionally, the image merging unit 730 is configured to merge the low-frequency sub-image and the high-frequency sub-image obtained by the image interpolation unit, through a wavelet packet inverse transform, to obtain the merged image.

The decomposition performed by the image decomposition unit 710 on the source image can make reference to the implementation in step S202 described above, the merging process performed by the image merging unit 730 can make reference to the implementation in step S205 described above, no more details repeated here.

Optimally, the image amplifying device further comprises: a transform unit 740 configured to perform a RGB-YUV space transform on the source image.

Optionally, the transform unit 740 is further configured to perform a YUV-RGB space inverse transform on the merged image.

Through the RGB-YUV space transform, the source image in the RGB color space may be transformed to the source image in the YUV color space; through the YUV-RGB space inverse transform, the source image in the YUV color space may be transformed to the source image in the RGB color space. Because vision has a higher sensitivity for a luminance signal than for a chrominance signal, through the RGB-YUV space transform, stability of the luminance signal of the original image can be ensured during the following interpolation process on the original image, and further it can be ensured that the amplified image has a good visual effect. The YUV-RGB space inverse transform makes the amplified image still to be an image in the RGB color space.

Optionally, the first interpolation algorithm includes: a nearest neighbor interpolation algorithm, a bilinear interpolation algorithm, and a cubic convolution interpolation algorithm; and the second interpolation algorithm includes: a nearest neighbor interpolation algorithm, and cubic convolution interpolation algorithm.

Figure 8:
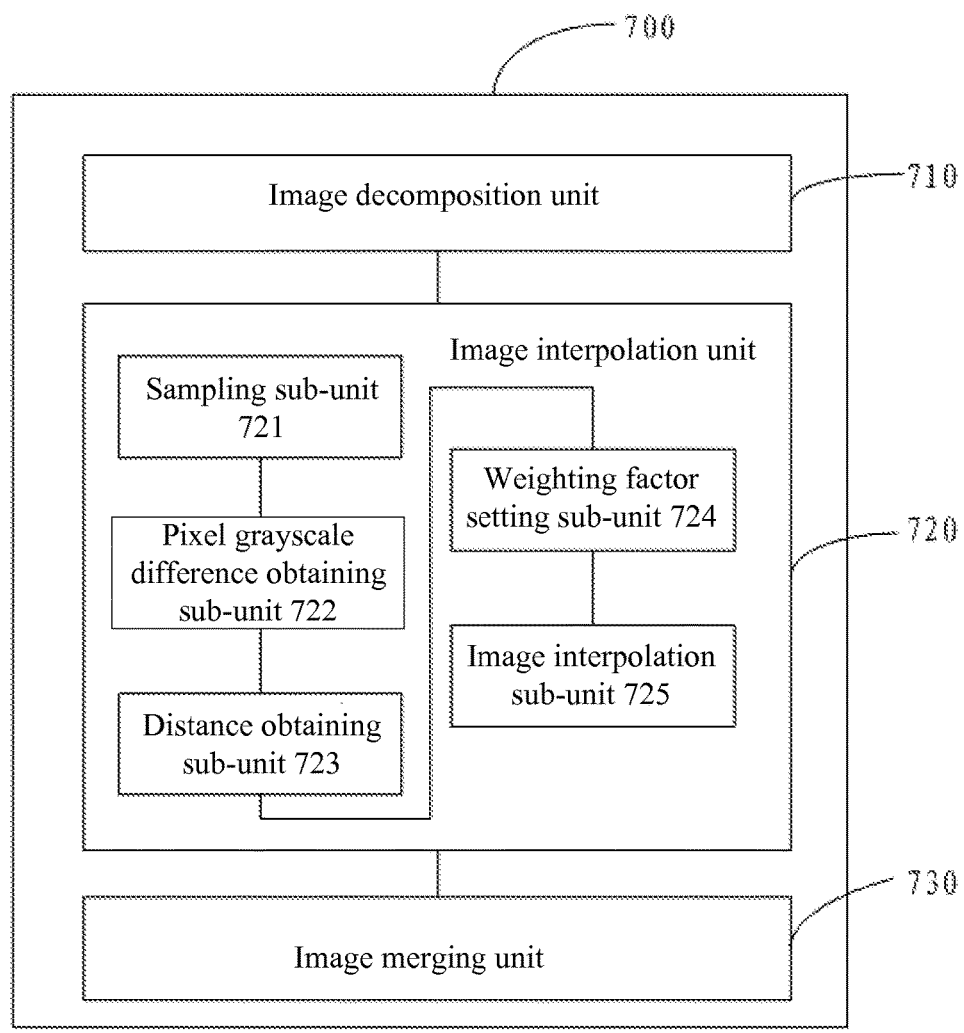
FIG. 8 is a schematic structural diagram of the image amplifying device provided by another embodiment of the present disclosure.

Further optionally, referring to FIG. 8, the first interpolation algorithm is a bilinear interpolation algorithm, and the image interpolation unit 720 comprises:

a sampling sub-unit 721 configured to select four pixel dots adjacent to a pixel dot to be interpolated in the low-frequency components of the source image;

a pixel grayscale difference obtaining sub-unit 722 configured to obtain a pixel grayscale difference in a horizontal direction, a pixel grayscale difference in a vertical direction, and a pixel grayscale in a diagonal direction of the four pixel dots adjacent to the pixel dot to be interpolated which are selected by the sampling sub-unit 721, according to locations and grayscales of the four pixel dots adjacent to the pixel dot to be interpolated;

a distance obtaining sub-unit 723 configured to obtain distances from the pixel dot to be interpolated to the four pixel dots adjacent to the pixel dot to be interpolated, according to the pixel grayscale difference in a horizontal direction, the pixel grayscale difference in a vertical direction, and the pixel grayscale in a diagonal direction which are obtained by the pixel grayscale difference obtaining sub-unit 722;

a weighting factor setting sub-unit 724 configured to set weighting factors for the four pixel dots adjacent to the pixel dot to be interpolated, according to the distances from the pixel dot to be interpolated to the four pixel dots adjacent to the pixel dot to be interpolated, which are obtained by the distance obtaining sub-unit 723; and an image interpolation sub-unit 725 configured to perform pixel interpolation on the pixel dot to be interpolated through the bilinear interpolation algorithm according to the weighting factors set by the weighting factor setting sub-unit 724, to obtain an interpolated low-frequency sub-pixel image.

The image amplifying device provided in the embodiments of the present disclosure first obtains high-frequency components and low-frequency components of a source image, then performs pixel interpolation on the pixels of the low-frequency components through a first interpolation algorithm to obtain a low-frequency sub-image and performs pixel interpolation on the pixels of the high-frequency components through a second interpolation algorithm to obtain a high-frequency sub-image, and finally merges the low-frequency sub-image and the high-frequency sub-image to obtain a merged image. Because interpolation is performed respectively on the high-frequency components and the low-frequency components of the source image through different interpolation algorithms, it can ensure image quality of the amplified image while reducing the operation amount.

An embodiment of the present disclosure provides a display apparatus, comprising any image amplifying device described above, the display apparatus may be a display apparatus such as electronic paper, mobile phone, television, and digital photo frame etc.

The display apparatus provided in the embodiments of the present disclosure first obtains high-frequency components and low-frequency components of a source image, then performs pixel interpolation on the pixels of the low-frequency components through a first interpolation algorithm to obtain a low-frequency sub-image and performs pixel interpolation on the pixels of the high-frequency components through a second interpolation algorithm to obtain a high-frequency sub-image, and finally merges the low-frequency sub-image and the high-frequency sub-image to obtain a merged image. Because interpolation is performed respectively on the high-frequency components and the low-frequency components of the source image through different interpolation algorithms, it can ensure image quality of the amplified image while reducing the operation amount.

In the several embodiments provided by present application, it should be understood that the method, device, and apparatus disclosed may also be implemented by other manners. The device embodiments above described are merely illustrative, for example, the unit division is only a logical function division, and there may be other division manners in practical implementation, for example, a plurality of units or components may be combined or may be integrated into another apparatus, or some features may be omitted or not executed.

Those described above are only embodiments of the present disclosure, however, the protection scope of the present disclosure is not limited thereto, those skilled in the art can readily conceive variations or replacements within the technical range disclosed by the present disclosure, which should all fall into the protection scope of the present disclosure. Accordingly, the protection scope of the present disclosure should be subjected to the protection scope of the claims.

The present application claims priority of Chinese Patent Application No. 201410503761.9 filed on Sep. 26, 2014, the disclosure of which is incorporated in entirety herein by reference as a portion of the present application.

What is claimed is:

1. An image amplifying method, comprising steps of:
    obtaining, by an image amplifying device, high-frequency components and low-frequency components of a source image;
    performing, by the image amplifying device, pixel interpolation on the low-frequency components of the source image through a first interpolation algorithm, to obtain a low-frequency sub-image;
    performing, by the image amplifying device, pixel interpolation on the high-frequency components of the source image through a second interpolation algorithm, to obtain a high-frequency sub-image; and
    amplifying the source image, by the image amplifying device, by merging the low-frequency sub-image and the high-frequency sub-image, to obtain an amplified image,
    wherein the first interpolation algorithm and the second interpolation algorithm adopt different algorithms.

2. The image amplifying method as claimed in claim 1, wherein the image amplifying device obtains the high-frequency components and the low-frequency components of the source image through a wavelet packet decomposition scheme.

3. The image amplifying method as claimed in claim 2, wherein the image amplifying device merges the low-frequency sub-image and the high-frequency sub-image, through a wavelet packet inverse transform, to obtain the amplified image.

4. The image amplifying method as claimed in claim 2, wherein prior to obtaining, by an image amplifying device, high-frequency components and low-frequency components of a source image, the method further comprises:
    performing, by the image amplifying device, a RGB-YUV space transform on the source image.

5. The image amplifying method as claimed in claim 1, wherein the image amplifying device merges the low-frequency sub-image and the high-frequency sub-image, through a wavelet packet inverse transform, to obtain the amplified image.

6. The image amplifying method as claimed in claim 1, wherein prior to obtaining, by an image amplifying device, high-frequency components and low-frequency components of a source image, the method further comprises:
    performing, by the image amplifying device, a RGB-YUV space transform on the source image.

7. The image amplifying method as claimed in claim 6, wherein after the amplifying the source image, the method further comprises:
    performing, by the image amplifying device, a YUV-RGB space inverse transform on the amplified image.

8. The image amplifying method as claimed in claim 1, wherein
    the first interpolation algorithm includes: a nearest neighbor interpolation algorithm, a bilinear interpolation algorithm, and a cubic convolution interpolation algorithm; and
    the second interpolation algorithm includes: a nearest neighbor interpolation algorithm, and cubic convolution interpolation algorithm.

9. The image amplifying method as claimed in claim 1, wherein the first interpolation algorithm is a bilinear interpolation algorithm; and the step of performing, by the image amplifying device, pixel interpolation on the low-frequency components of the source image through a first interpolation algorithm to obtain a low-frequency sub-image comprises:
    selecting, by the image amplifying device, four pixel dots adjacent to a pixel dot to be interpolated in the low-frequency components of the source image;
    obtaining, by the image amplifying device, a pixel grayscale difference in a horizontal direction, a pixel grayscale difference in a vertical direction, and a pixel grayscale in a diagonal direction of the four pixel dots adjacent to the pixel dot to be interpolated, according to locations and grayscales of the four pixel dots adjacent to the pixel dot to be interpolated;
    obtaining, by the image amplifying device, distances from the pixel dot to be interpolated to the four pixel dots adjacent to the pixel dot to be interpolated, according to the pixel grayscale difference in a horizontal direction, the pixel grayscale difference in a vertical direction, and the pixel grayscale in a diagonal direction;
    setting, by the image amplifying device, weighting factors for the four pixel dots adjacent to the pixel dot to be interpolated, according to the distances from the pixel dot to be interpolated to the four pixel dots adjacent to the pixel dot to be interpolated; and
    performing, by the image amplifying device, pixel interpolation on the pixel dot to be interpolated, through the bilinear interpolation algorithm, according to the weighting factors to obtain an interpolated low-frequency sub-pixel image.

10. An image amplifying device, comprising a processor configured to:
    obtain high-frequency components and low-frequency components of a source image;
    perform pixel interpolation on the low-frequency components of the source image, through a first interpolation algorithm, to obtain a low-frequency sub-image;

perform pixel interpolation on the high-frequency components of the source image, through a second interpolation algorithm, to obtain a high-frequency sub-image; and amplify the source image by merging the low-frequency sub-image and the high-frequency sub-image, to obtain an amplified image, wherein the first interpolation algorithm and the second interpolation algorithm adopt different algorithms.

11. The image amplifying device as claimed in claim 10, wherein the processor is further configured to obtain the high-frequency components and the low-frequency components of the source image through a wavelet packet decomposition scheme.

12. The image amplifying device as claimed in claim 11, wherein the processor is further configured to merge the low-frequency sub-image and the high-frequency sub-image, through a wavelet packet inverse transform, to obtain the amplified image.

13. The image amplifying device as claimed in claim 11, wherein the processor is further configured to perform a RGB-YUV space transform on the source image.

14. The image amplifying device as claimed in claim 11, wherein the first interpolation algorithm is a bilinear interpolation algorithm, and the processor is further configured to:

select four pixel dots adjacent to a pixel dot to be interpolated in the low-frequency components of the source image;

obtain a pixel grayscale difference in a horizontal direction, a pixel grayscale difference in a vertical direction, and a pixel grayscale in a diagonal direction of the four pixel dots adjacent to the pixel dot to be interpolated, according to locations and grayscales of the four pixel dots adjacent to the pixel dot to be interpolated;

obtain distances from the pixel dot to be interpolated to the four pixel dots adjacent to the pixel dot to be interpolated, according to the pixel grayscale difference in a horizontal direction, the pixel grayscale difference in a vertical direction, and the pixel grayscale in a diagonal direction;

set weighting factors for the four pixel dots adjacent to the pixel dot to be interpolated, according to the distances from the pixel dot to be interpolated to the four pixel dots adjacent to the pixel dot to be interpolated; and perform pixel interpolation on the pixel dot to be interpolated through the bilinear interpolation algorithm according to the weighting factors, to obtain an interpolated low-frequency sub-pixel image.

15. The image amplifying device as claimed in claim 10, wherein the processor is further configured to merge the low-frequency sub-image and the high-frequency sub-image, through a wavelet packet inverse transform, to obtain the amplified image.

16. The image amplifying device as claimed in claim 10, wherein the processor is further configured to perform a RGB-YUV space transform on the source image.

17. The image amplifying device as claimed in claim 16, wherein the processor is further configured to perform a YUV-RGB space inverse transform on the amplified image.

18. The image amplifying device as claimed in claim 10, wherein the first interpolation algorithm includes a nearest neighbor interpolation algorithm, a bilinear interpolation algorithm, and a cubic convolution interpolation algorithm; and the second interpolation algorithm includes a nearest neighbor interpolation algorithm, and a cubic convolution interpolation algorithm.

19. The image amplifying device as claimed in claim 10, wherein the first interpolation algorithm is a bilinear interpolation algorithm, and the processor is further configured to:

select four pixel dots adjacent to a pixel dot to be interpolated in the low-frequency components of the source image;

obtain a pixel grayscale difference in a horizontal direction, a pixel grayscale difference in a vertical direction, and a pixel grayscale in a diagonal direction of the four pixel dots adjacent to the pixel dot to be interpolated, according to locations and grayscales of the four pixel dots adjacent to the pixel dot to be interpolated;

obtain distances from the pixel dot to be interpolated to the four pixel dots adjacent to the pixel dot to be interpolated, according to the pixel grayscale difference in a horizontal direction, the pixel grayscale difference in a vertical direction, and the pixel grayscale in a diagonal direction;

set weighting factors for the four pixel dots adjacent to the pixel dot to be interpolated, according to the distances from the pixel dot to be interpolated to the four pixel dots adjacent to the pixel dot to be interpolated; and perform pixel interpolation on the pixel dot to be interpolated through the bilinear interpolation algorithm according to the weighting factors, to obtain an interpolated low-frequency sub-pixel image.

20. A display apparatus, comprising the image amplifying device as claimed in claim 10.

* * * * *